April 17, 1934.  E. W. MILLER  1,955,082
MEANS FOR FINISHING GEARS BY LAPPING, ETC
Filed Jan. 16, 1931  4 Sheets-Sheet 1
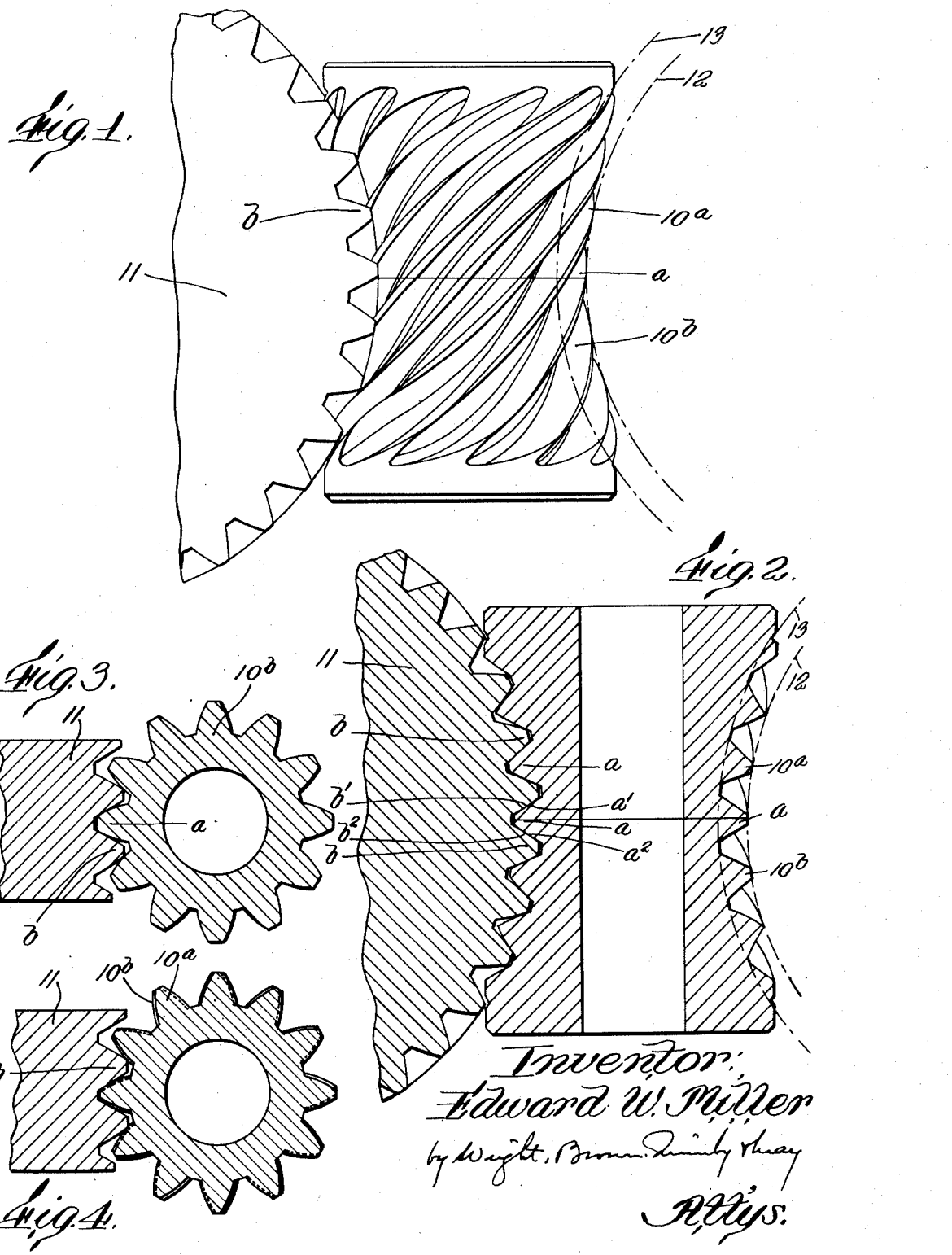

April 17, 1934.  E. W. MILLER  1,955,082
MEANS FOR FINISHING GEARS BY LAPPING, ETC
Filed Jan. 16, 1931  4 Sheets-Sheet 2
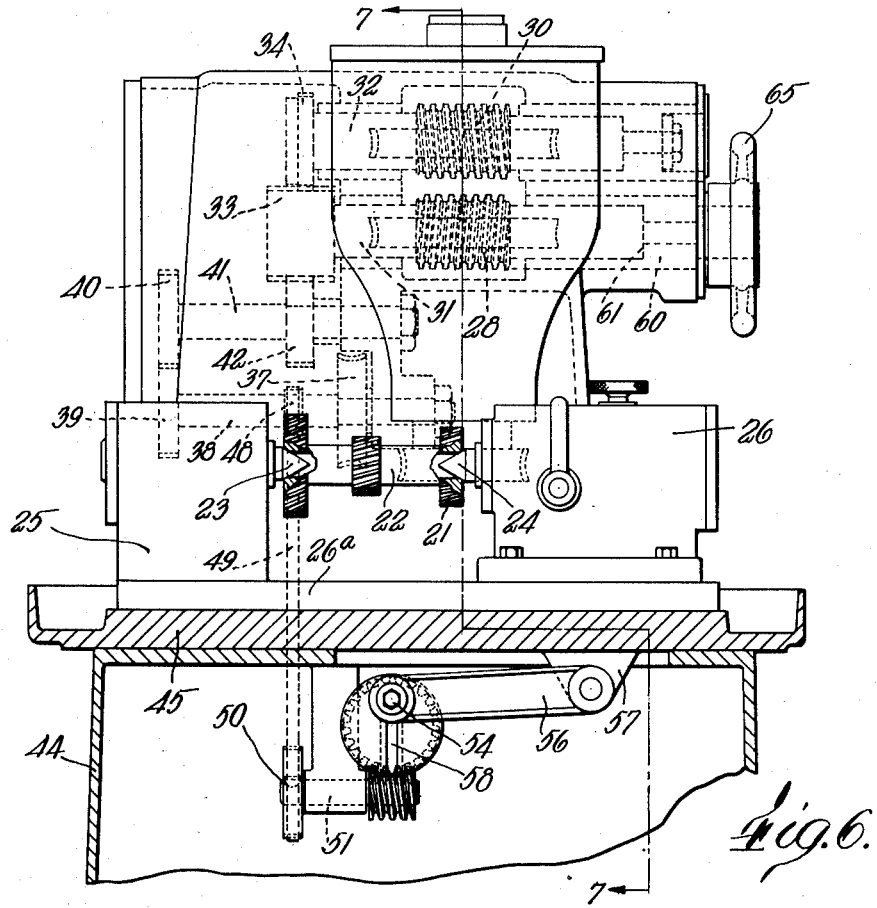
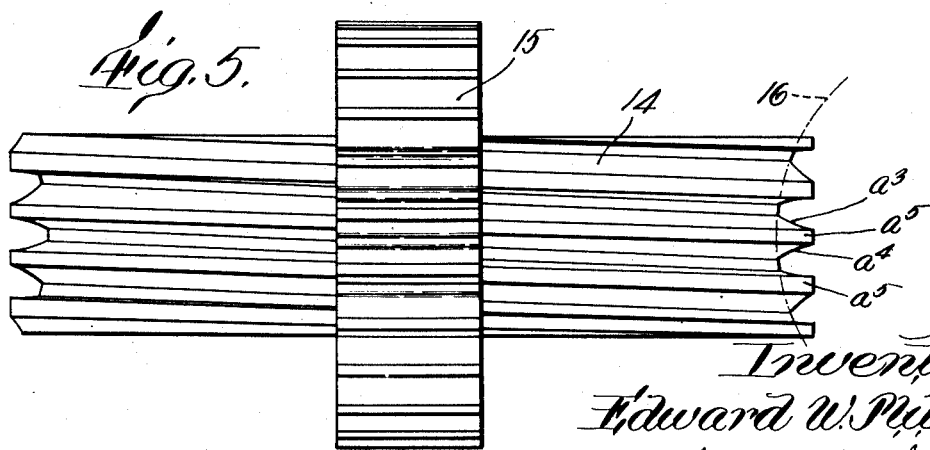
Inventor
Edward W. Miller

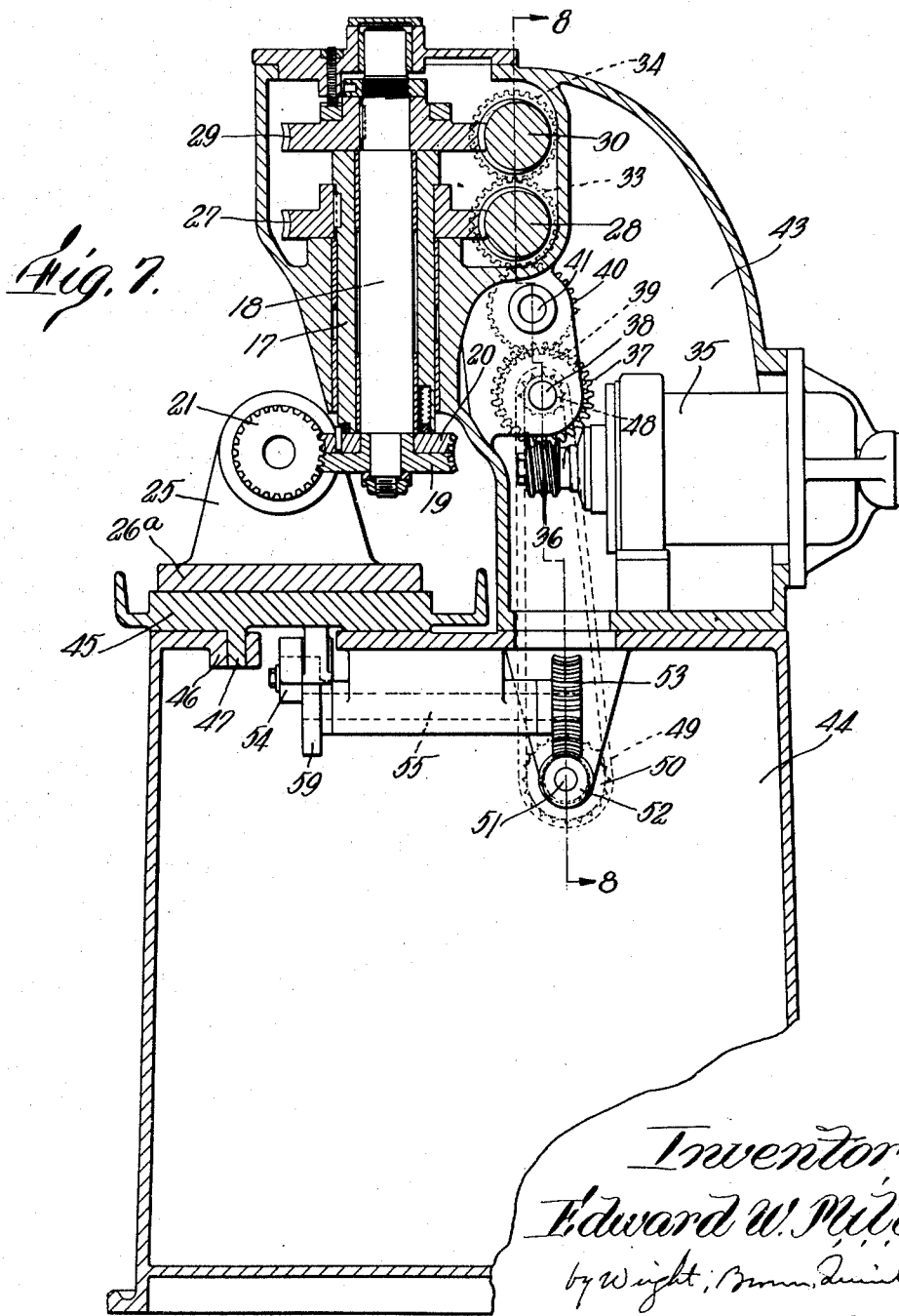

April 17, 1934.　　　　E. W. MILLER　　　　1,955,082
MEANS FOR FINISHING GEARS BY LAPPING, ETC
Filed Jan. 16, 1931　　　4 Sheets-Sheet 4
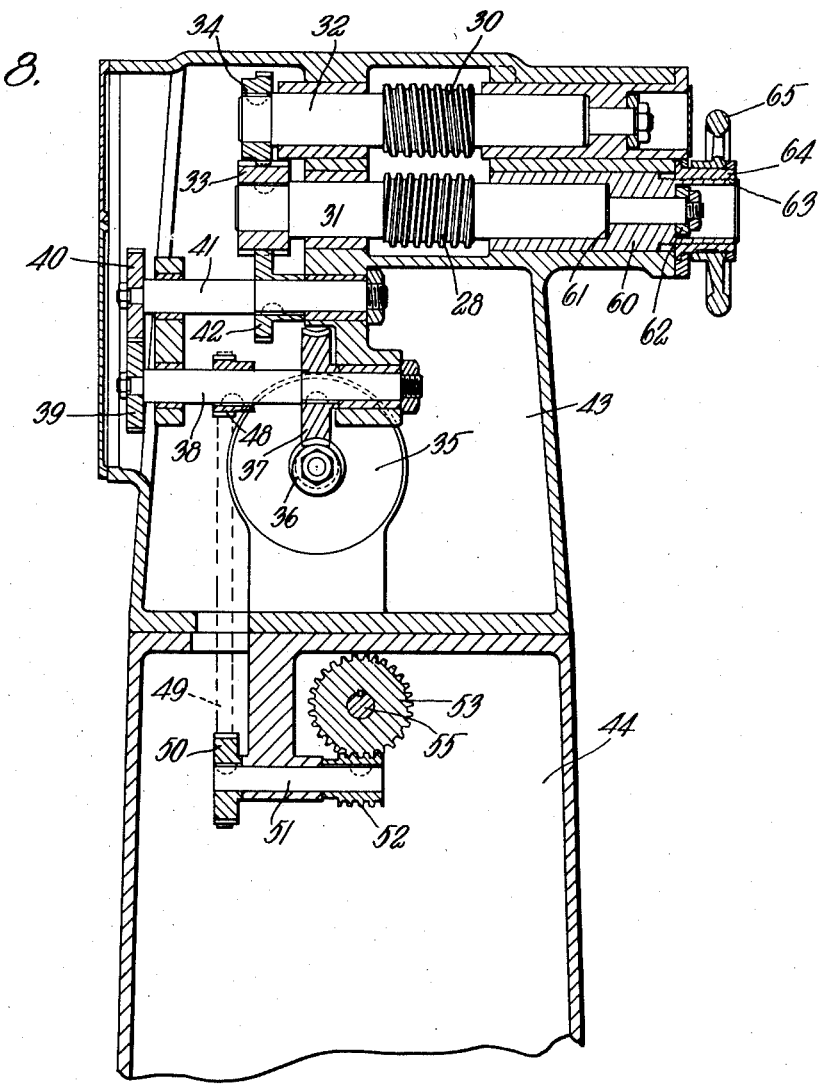
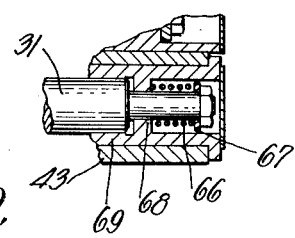

Patented Apr. 17, 1934

1,955,082

UNITED STATES PATENT OFFICE 1,955,082

MEANS FOR FINISHING GEARS BY LAPPING, ETC.

Edward W. Miller, Springfield, Vt., assignor to The Fellows Gear Shaper Company, Springfield, Vt., a corporation of Vermont Application January 16, 1931, Serial No. 509,099

7 Claims. (Cl. 51—95)

This invention relates to machines for finishing gears by removing or obliterating small errors in the form, spacing or surfaces of their teeth. Such errors may occur from a variety of causes, such as failure to finish the hole in the gear, after hardening, exactly concentric with the pitch line of the teeth, distortion of the gear in heat treatment for hardening or other purposes, displacement of some part of the gear cutting or generating machine in the course of cutting the gear, tool marks left by the cutter, etc. Perhaps the most frequent and serious errors may be summed up as consisting of eccentricity in some manner of the teeth to the hole in the gear. They are all minute in gears cut by good machines with proper adjustment and operation, but they are not certainly avoidable with even the best machines, the best tools and the most careful adjustment and supervision of the machines. The clearances between moving parts of such machines necessary for lubrication, for instance, are sufficient to cause appreciable although minute errors. But even the smallest of such errors may cause failure of the gears to run with the desired degree of smoothness and quietness where smoothness and quiet in high degree are required; while of course carelessness in setting up the gear cutting machine and work piece increases the errors many fold. It is my purpose to provide a machine by which these errors may be obliterated before the gears are put into service.

The gears which this machine is designed to treat are both straight spur gears and helical gears. The action carried out is that of rubbing and pressing the teeth of the gear being treated by a tool which has teeth complemental to those of the work piece. In order to remove the irregularites in the work piece as rapidly as possible, I prefer to supply finely divided abrasive between the contacting surfaces of the tool and work, thus performing the operation called lapping; although the utlimate result may be accomplished by the same tool without abrasive, but more slowly, in a burnishing operation. In either case there is mutual wear between the teeth of the tool and of the work.

A part of my purpose is to distribute the wearing effect on the tool with a near approach to equality over all, or nearly all, the height (from root to outer circumference) of its teeth in order to preserve the faces of such teeth in their correct form for long periods of use in spite of the displacement of material from such faces which takes place by abrasion, or by flow under pressure, or both. To this end the tool is formed as a throated gear member, that is, with at least the bottoms of its tooth spaces, and in some cases the tops of the teeth and all intermediate longitudinal elements as well, formed with a concave curvature in the axial direction of the tool, its teeth are given a helical curvature around its geometrical axis, and the tool is rotated about that axis, which is located preferably in a line perpendicular to the axis of the work piece but passing the latter axis at one side without intersection. In other words, the tool axis is perpendicular to a line parallel to the axis of the work piece. This perpendicular relation is prefered for simplicity and greater ease of building the machine and setting it up to work accurately; but if the situation requires setting of one axis oblique, or askew, with respect to the other (as for acting on a spur gear with a helical tool of somewhat steep helix angle), the machine may be made or adjusted with those axes thus oblique, within the scope of the invention and of the protection claimed herein.

As the teeth of the tool wear away, and as they may be reformed from time to time to correct inaccuracies due to wear, they become thinner. But for automatic correction of errors in spacing of the work piece teeth it is necessary that the teeth of the tool occupy fully (without backlash) the tooth spaces of the work, while the ability of the tool to finish the tooth curves of the work to correct form at all times depends on maintaining the same distance between the axes of the tool and work at all stages in the life of the tool, when operating on gears of the same size, pitch and pressure angle. Such distance is called, for convenience, the center distance between tool and work. Therefore another object is to enable the tool, in spite of such thinning of its teeth, to bear and act simultaneously on both sides of the tooth spaces, and teeth, of the work without any change in the center distance.

The nature of the invention can best be explained by a detailed description of a specific embodiment thereof, as is done in the following specification; but it may be briefly and comprehensively stated as comprising a tool having the necessary configuration for enveloping the teeth of the work while acting upon them, and a machine having holding, driving and adjusting means for the tool and work piece, which may be combined with means to compensate for thinning of the teeth of the tool resulting from wear, without changing the center distance. Illustration of the principles of the invention is given by the following drawings, in which Fig. 1 is a side elevation of a lapping tool made according to this invention for finishing a helical gear of certain characteristics, with a fragment of the gear being finished;

Fig. 2 is a section of the tool and work piece taken on a plane including the axis of the tool and perpendicular to the axis of the work;

Fig. 3 is a cross section of the tool and work piece taken on a plane perpendicular to the axis of the tool and including the axis of the work, showing an unworn tool;

Fig. 4 is a sectional view similar to Fig. 3 but showing a tool of which the teeth have become thinner, and the manner in which compensation is made for thinning down of such teeth;

Fig. 5 is an elevation of a spur gear and a lapping tool designed to cooperate therewith according to the principles of the present invention;

Fig. 6 is a front elevation of a machine embodying one of the phases of the invention and designed for actuating tools of the character shown in the preceding figures;

Fig. 7 is a vertical section of the machine taken from front to rear on planes indicated by the line 7—7 of Fig. 6;

Fig. 8 is a transverse vertical section of the machine taken on the plane indicated by line 8—8 of Fig. 7;

Fig. 9 is a detail sectional view showing an automatic adjusting means for the tool adapted to maintain a given lateral pressure of its teeth, however much reduced in thickness by wear, on the teeth of the work piece, usable in substitution for the adjusting means shown in Fig. 8.

Like reference characters designate the same parts wherever they occur in all the figures.

I will describe first the characteristics of the tool and its relationship to the work piece, by which a new effect in the finishing of gears is obtained. For convenience of description, I will generally call the operation that of lapping, and the tool a lap; but without intending thereby to imply a limitation of the invention to the use only of lapping, so called. Whether the action is that of lapping or burnishing depends on the use of abrasive, or its lack, respectively; and the tool, the manner of its operation, and the machine, are all essentially the same in both uses.

The lap is a throated helical gear element of which the tooth faces, in axial planes, are substantially counterparts of the tooth face curves of the work piece in planes perpendicular to the axis of the latter, at least as to the teeth in the middle part of the tool. In the foregoing statement the middle part is considered with respect to the axial length of the tool; and the term "gear element" is used in a broad sense to include toothed or ribbed members having helical teeth or ribs of any number, any pitch and any helix angle, while the words "tooth" and "teeth" are used with equivalent scope to designate helical projections of such gear elements which are adapted to mesh with the teeth of helical or spur gears, as will more fully appear from the further description herein. The teeth at the middle of the tool have, in the plane of section perpendicular to the axis of the tool, involute face curves conjugate to the tooth curves of the work piece in radial planes of the latter. In Figs. 1, 2 and 3, 10a—10b represent the tool, which is preferably made in two parts for the purpose of adjustment to compensate for wearing of its teeth, as will be later explained, and 11 represents the work piece, which in this instance is a standard helical gear having involute face curves. The tool in these figures is deeply throated, which makes the tops or points of its teeth tangent to a longitudinal concave curve indicated by the line 12 in Fig. 1, while the bottoms of its tooth spaces are tangent to a curve 13. But the essentials of the throated formation are present in any case where the tooth spaces are tangent to such a curve even though the outermost points are not thus concave. The teeth of the tool are designated $a$ and those of the work piece $b$. It will be noted from Fig. 2 that the faces $a'$, $a^2$ of the teeth $a$, in their parts nearest to the longitudinal middle of the tool, are substantially counterparts of the faces $b'$, $b^2$, respectively, of the work piece teeth, and that a large number of teeth of the work are engaged all at the same time by some parts, at least, of an equal number of teeth in the tool. However, in planes at right angles to the axis of the tool, the teeth of the tool and work are conjugate similarly to the teeth of two spur gears or of a rack and pinion, as appears plainly from Fig. 3. The counterpart formation of the teeth, in axial section of the tool, produces an extended bearing throughout substantially the entire radial height of the teeth, at least in the middle zone of the tool, with an extension of the bearing area to some distance at each side of the plane on which the section of Fig. 2 is taken (this being a plane perpendicular to the axis of the work piece midway between its ends and containing the axis of the tool) with a gradual separation of the contacting surfaces toward the ends of the work piece. This extended contact, as also the more limited contact which takes place between the teeth at each side of the longitudinal middle zone of the tool, distributes widely the pressure exerted by and on the teeth of the tool, equally distributes the wearing effect on the tool, and distributes the action of the tool simultaneously over a large number of teeth of the work piece. This produces new and much improved lapping effects.

One effect, which is contributed by the endwise sliding movement of the teeth due to the fact that they are helical, is that the rubbing and abrading effect on the work piece is substantially as great on the pitch line as it is toward the roots and points of its teeth. Where elements in the nature of conjugate spur gears run together, with their only motion that of rotation about their parallel axes, there is no slip on the pitch line, but progressively increasing slip in radial directions at points respectively nearer to the roots and tips of the contacting teeth. With conjugate helical gears turning about non-parallel axes there is a slip at the pitch point as well, due to the lengthwise sliding of the teeth which follows from their helical arrangement and the inclination to each other of their planes of rotation, but the greater slip and wear toward the points and roots of the teeth is still a substantial factor. The new step of the present invention now being described carries the distribution of rubbing action still further, and substantially eliminates all difference of abrasive effect as between the pitch point and the extremities of the teeth, making it so great at the pitch point as to cause the difference between the effect there, and that at the extremities (root and tip) of the teeth to be inappreciable. Many lapping and burnishing procedures include also a reciprocation axially of the gear being treated with respect to the tool, or of the tool with respect to the gear, in order to give a longitudinal component of rubbing and abrading movement along the teeth of the work. My procedure includes this component of movement also, as will be explained in the following description of the machine; wherefore I add to the improved effect above described, all the benefit heretofore known due to such endwise reciprocative movement.

Another effect is that the wearing away of the tool, which unavoidably occurs, particularly when used with an abrasive, does not destroy measurably the accuracy of its tooth face forms until after long use and much attrition has occurred. As in the case of all other tools which have a rubbing and abrading action, the tool requires to be trued and reformed occasionally; but by reason of the characteristic now being discussed, such occasions are relatively infrequent.

Still another effect is that the contact between the tool and the work toward and near the ends (in the axial direction) of the tool gives an increment of finishing action there, and lightens to some extent the duty required of the teeth at the central zone where the contact is greatest and the lapping effect most pronounced, thus relieving such central teeth, or central parts of the teeth, of much of the wear to which otherwise they would be subjected. It also assists in centering the work with respect to the tool and hastens the result of bringing the teeth of the work piece truly concentric with its axis and into correct spacing. Evidently the engagement by a large number of teeth more quickly and accurately removes the surplus stock necessary to bring the gear teeth to correct spacing than could be done otherwise.

I have previously stated that the principles of the invention may be applied to finishing gears of any helix angle by means of tools having any corresponding helix angle. The extreme limit in one direction of this proposition is the case of a straight spur gear and a cooperating tool having teeth with the helix angle of a single screw thread, and being of such large diameter that the helical deviation from a straight line is inappreciable. This case is shown in Fig. 5, where the tool is designated 14 and the work piece 15. The latter is a spur gear of involute type. The tool has a single helical rib of several convolutions, the spacing of which conforms to the teeth of the work piece. It differs from an ordinary worm, and is like the multiple toothed tool first described in that it is throated and the sides of its helical rib have a counterpart formation to the teeth of the work piece. In effect, the successive turns of the rib are teeth formed to embrace the teeth of the work piece with contact throughout substantially their entire radial height. Although the outside limits of the tool are parts of the same cylindrical surface, the essentials of the throated characteristic are found in the fact that the bottoms of the tooth spaces between turns of the rib lie in a circular arc 16, the radius of which is enough larger than the outside radius of the gear 15 to permit entrance of the teeth of the latter to full mesh. And the sides $a^3$, $a^4$ of the helical teeth $a^5$ are curved complementally to the tooth curves of the work piece.

Equally, the same principles may be applied to tools and gears of various dimensions, pitches and pressure angles. It may, for instance, be applied to a tool of extremely small diameter, so small as to be capable of entering deeply the angle between a gear and an adjacent shoulder on a work piece, and finishing the gear close up to such a shoulder. In any event the tool is made with a spacing and form of its teeth, and with its throated curvature, of proper values to fit the characteristics of the gear for the finishing of which it is to be used. Such tools may be manufactured accurately by methods, and the use of machines, which I have disclosed in other applications. For generating any such tool a gear shaper cutter of the same diameter, pitch, pressure angle and helix angle as the gear to be finished is used.

A machine suitable for holding and operating the tool and work to produce the effects described is illustrated in Figs. 6-9 with the understanding that the principles so illustrated are applicable in many other forms of machine. Incidentally it may be noted that the tool with which this machine is equipped is of specifically different dimensions than either of those previously described, for finishing a specifically different gear, but that it embodies the same essential characteristics.

A tubular tool spindle or quill 17 is mounted rotatably in an upright position in bearings provided in a suitable frame. Within the tubular spindle is rotatably mounted and fitted a central inner spindle 18. To the inner spindle is secured a lapping tool 19, and to the outer spindle is secured a lapping tool 20, these tools corresponding to the parts 10b and 10a respectively of the tool shown in Fig. 1 and abutting against one another on an accurately finished plane surface perpendicular to the common axis of the spindles. The work piece is a helical gear 21 integral with a shaft 22 which is mounted to turn on centers 23 and 24 secured in fixtures 25, 26, respectively mounted on a base 26a. It will be understood that the gear 21 or other equivalent work piece may be otherwise located, and secured permanently or detachably to any other shaft or mandrel, and that the centers 23, 24 and their supporting fixtures are retractable and adjustable to receive and release the work, and to take work pieces, shafts and mandrels of various lengths. A worm wheel 27 is secured to the outer spindle 17 and is driven by a worm 28. A worm wheel 29 is secured to the inner spindle 18 and driven by a worm 30. These worms are mounted on parallel shafts 31 and 32 respectively, as shown in Fig. 8, and are coupled together for rotation in unison but in opposite directions by intermeshing gears 33 and 34 on their adjacent ends. An electric motor 35, typical of a variety of possible driving means, drives these worm shafts through a worm 36 on its armature shaft, intermeshing worm wheel 37 on a shaft 38, change gears 39 (on shaft 38) and 40 (on a shaft 41), and gear 42 on shaft 41 meshing with gear 33. Thus both worms 28 and 30 are driven at the same rate of speed. In order that they may drive both spindles 17 and 18 in the same direction and at the same speed, their threads are of respectively opposite helical inclinations, are equal in diameter and pitch, and the worm wheels 27 and 29 are alike in diameter and number of teeth. The change gears 39 and 40 are provided in order to vary the speed of the lapping tool since, by reason of different designs of work piece, the diameter of different laps used in the same machine may vary to a great degree; as indeed has been made apparent by the foregoing description.

In order to accommodate the machine to work pieces and laps of different diameters, the superstructure 43 which carries the spindles and their driving means is adjustably mounted on the base 44, on which the work carriage is separately supported. The adjustment so provided enables the tool carrying head to be moved back and forth to increase or diminish the distance between the tool and work axes. The means for effecting such adjustment may be of any of the types commonly used in machine tools, and are so well known to builders of such machines as to require no illustration here.

The tool is brought into close mesh with the work, that is, with its teeth bearing on opposite sides of the teeth of the work piece and of the tooth spaces therein, and drives the work piece. The use of conical centers, as here shown, for supporting the work piece enables it to be mounted without looseness, whereby it is given the utmost possible accuracy of position and movement.

The base of the work carriage is mounted on a bed 45 which rests slidingly on the machine base and is controlled by cooperating guide members 46 and 47 so that its sliding movement is limited to a direction parallel to the work axis. It is so driven by the motor 35 through a sprocket 48 on shaft 38, chain 49, sprocket 50 on a shaft 51, helical gears 52, 53, crank 54 on the same shaft 55 with gear 53, and connecting rod 56 pivoted to a lug 57 on the slide 45. Thus the work is moved back and forth to distribute the lapping effect over the entire axial length of its teeth. The shafts 51 and 55 are mounted in bearings secured to the stationary machine base 44. The flexible driving connection provided by the chain 49 enables the superstructure 43 to be moved as required to adjust the machine for work pieces and tools of different diameters. The fact that the shafts 38 and 51 are nearly in the same vertical plane throughout the entire range of adjustment of the superstructure, while such adjustment is horizontal, and that the plane of the chain is parallel to the direction of such adjustment, insures that the chain will remain in proper mesh with its sprockets throughout this entire range. Provision for adjustment of the reciprocating travel given to the work, so that it will be treated throughout its entire length without passing out of mesh with the tool at either end of its travel, is made by mounting the crank pin 54 in a radial slot 58 of the disk 59, and by adjusting the center fixtures on the base of the work carriage so that the middle transverse plane of the work piece coincides with the tool axis when the carriage is in the middle of its traverse.

The crank and connecting rod mechanism for moving the carriage is one of various mechanical means which may be used for the same purpose, within the knowledge of machine builders and within the scope of protection which I claim. For instance, cams of various characters may be substituted for the crank motion and designed to effect any desired relative rates of speed throughout the strokes of the carriage, with longer or shorter pauses at the reversing points of its movement, as may be desired, all within the scope of the invention as claimed herein.

The construction which has previously been described of making the tool in two parts, mounting each part on a separate spindle, and driving said spindles through independent worms and worm wheels, is provided in order to permit adjustment of the tool so that it will correct eccentricity of the gear teeth, and to compensate for thinning of the tool teeth with extended wear. In the adjustment for correction of eccentricity, one part of the tool is rotated relatively to the other so that when placed at the right center distance from the gear, its teeth strike only the high spots of the gear teeth; and as these are worn down, the tool is further adjusted, and run, until all the gear teeth engage the tool teeth equally. The adjustment compensatory for tooth thinning is of the same character but additional to the other. Their nature is shown by a comparison of Figs. 3 and 4. In Fig. 3 the middle cross section of a newly completed tool, designed to cooperate with the work piece 11, is shown. The outline of the tool may be considered as that of the upper end of the tool section 10b shown in Fig. 1. When undiminished by wear and placed at the correct center distance from the work, the teeth of the tool occupy the tooth spaces of the work without backlash, if the work piece teeth are concentric. When the piece is known to be eccentric, and an unworn tool is used, the tool selected is one which will thus fill the spaces in the work piece at the side thereof where such spaces are narrowest. But when the tool is worn, or refinished after wear, its teeth will not fill the width of any of such spaces. Fig. 4 shows the tool after such an adjustment has been made by turning its upper part 10a so that the teeth thereof overhang the teeth of the lower part 10b at one side and are withdrawn at their opposite sides. In other words, the teeth of the two parts are slightly out of register, to a greater or less degree, at the dividing plane. In this figure, the upper tool member is shown in horizontal section on a plane just above the dividing plane, and the lower member is shown in plan.

Not only does the adjustment of the tool correct eccentricity, but it improves the gear in other respects, making it accurate as to tooth spacing and form under all tests. It permits simplification of the machine also, by doing away with the necessity of any frictional or spring resistance to the work, which would be necessary to maintain the lapping pressure if backlash were not thus taken up; and shortens the time of completing the work by causing the work piece teeth to be finished on both sides at once.

This adjustment is accomplished with the machine here shown by moving endwise the worm 28 which controls the upper tool member 20 (and alternatively the tool member 10a when the tool of Fig. 1 is substituted in the machine). For so moving the worm 28 I provide a sleeve 60 in which one end of the worm shaft 31 has a bearing and is confined between end thrust shoulders 61 and 62. Said sleeve is splined in the worm housing of the machine so that it may move endwise, and is provided with a threaded outward extension 63 engaged with a nut, or internally threaded sleeve, 64, on which a hand wheel 65 is secured. Nut 64 reacts on the housing and is confined without looseness and with friction, or other suitable locking means, so that it will remain in its adjusted position. The gear 33 on the worm shaft is made with a wide enough face to remain in mesh with gears 34 and 42 throughout the entire range of such endwise adjustment. By this means a positive pressure may be exerted between the teeth of the tool and the teeth of the work piece, of any intensity desired to accomplish the finishing effect.

If it is desired to maintain a constant pressure between the teeth of tool and work, regardless of the eccentricity of the work piece, a spring may be substituted for the screw adjustment just described. Such an alternative spring is shown in Fig. 9 at 66, being interposed between a shoulder 67 on the outer end of the reduced extension of shaft 31, and a shoulder 68 within a non-adjustable fixed sleeve 69 in which the end portion of shaft 31 has its bearing.

While the improvement which consists in making the tool in two parts or, in other words, providing two tools which together make a complete lap, and adjusting them in the manner described, is a valuable feature of the invention for which I claim the fullest measure of protection, it is not an essential of the broader aspects of the invention which are concerned with the counterpart formation of the tool and work in radial planes of the former and the effect produced thereby. This feature may be embodied in a single, or one part, tool, as indeed is illustrated by the tool shown in Fig. 5, although the latter may be divided in the same manner as the others. But when a tool made complete in one piece is used, it may be applied to the inner spindle 18, or to a machine otherwise like that before described except for the omission of the outer spindle or its equivalent and the means for separately operating it and for adjusting it angularly with respect to the first spindle.

What I claim and desire to secure by Letters Patent is:

1. A gear finishing machine comprising means for supporting a gear to be finished with provision for rotation about its own axis, a tool having helical teeth which in axial planes of the tool are arranged on a concave line conforming to the circular alinement of the teeth of the gear to be finished and have lateral faces complemental to the face curves of such gear, said tool being composed of two parts fitting against one another on a plane transverse to the axis, means for holding said tool with its teeth in mesh with the gear, means for rotating the tool about its geometrical axis, whereby it drives the gear and applies rubbing pressure to the tooth faces thereof, and means for adjusting one part of the tool relatively to the other part angularly about the axis of the tool.

2. A gear finishing machine comprising a plurality of spindles having a common axis, tool members each mounted on one of said spindles meeting one another in a plane perpendicular to said axis and together forming a complete lapping or burnishing tool having helical teeth adapted to mesh with the teeth of a gear to be finished, means for rotating said spindles in unison, and means for adjusting one of said spindles angularly with respect to the other.

3. A gear finishing machine comprising two coaxial spindles, a worm wheel secured to each spindle, a worm meshing with each of said worm wheels, means for driving said worms at such speeds and in such directions as to propel both spindles equally in the same direction, means for moving one of said worms endwise whereby to adjust the spindle driven thereby angularly with respect to the other, tool members mounted each on one of said spindles and fitted together on a plane perpendicular to said axis, said tool members collectively forming a complete lapping or burnishing tool having helical teeth adapted to mesh with the teeth of a gear to be finished, and means for supporting such a gear rotatably with its axis transverse to that of the tool spindles and with its teeth in mesh wtih the teeth of the tool.

4. A gear finishing machine comprising two coaxial spindles, a worm wheel secured to each spindle, a worm meshing with each of said worm wheels, means for driving said worms at such speeds and in such directions as to propel both spindles equally in the same direction, means for moving one of said worms endwise whereby to adjust the spindle driven thereby angularly with respect to the other, tool members mounted each on one of said spindles and fitted together on a plane perpendicular to said axis, said tool members collectively forming a complete lapping or burnishing tool having helical teeth adapted to mesh with the teeth of a gear to be finished, a work carriage having means for supporting such gear rotatably with its axis transverse to that of said spindles and its teeth in mesh with the teeth of the tool, and means for reciprocating said carriage lengthwise of the axis of the gear.

5. In a gear finishing machine having a lapping or finishing tool formed with a throated gear element adapted to act on the gear to be finished at a fixed center distance therefrom, means for adjusting said tool to compensate for reduction in the thickness of its teeth to less than the width of the tooth spaces in the work, which consists in making the tool in two parts, separated and fitting together on a plane perpendicular to the axis and located at the middle of its throated concavity, and adjusting one of said parts angularly about said axis with respect to the other to a distance sufficient for taking up any backlash between the tool and work.

6. A machine for finishing helical gears comprising a tool formed as a throated helical gear element with teeth complemental to those of the gear to be finished, the tool being formed of two parts divided from one another on a plane perpendicular to the axis, one of which is angularly adjustable about such axis relatively to the other to compensate for a difference between the width of tooth spaces in the gear to be finished and the thickness of teeth of the tool, means for mounting said tool and gear on non-intersecting and non-parallel axes, and means for rotating one of them.

7. A machine for finishing helical gears comprising a tool formed as a throated helical gear element with teeth complemental to those of the gear to be finished, the tool being formed of two parts divided from one another on a plane perpendicular to the axis, one of which is angularly adjustable about such axis relatively to the other to compensate for a difference between the width of tooth spaces in the gear to be finished and the thickness of teeth of the tool, means for mounting said tool and gear on non-intersecting and non-parallel axes, means for rotating one of them, and means for reciprocating the gear at the same time.

EDWARD W. MILLER.